United States Patent Office 2,805,242
Patented Sept. 3, 1957

2,805,242

1-CYANOBICYCLO[4.2.0]OCTA-2,4-DIENES AND THEIR SYNTHESIS

Donald Emory Ayer, Bradford, N. H., and George Hermann Buchi, Cambridge, Mass., assignors, by direct and mesne assignments, to E. I. du Pont de Nemours and Company, Wilmington, Del., a corporation of Delaware No Drawing. Application January 11, 1957, Serial No. 633,524

8 Claims. (Cl. 260—465)

This invention relates to cyclic organic compounds, more particularly certain unsaturated bicyclic compounds, and to their preparation.

Cyclic organic compounds are of considerable value in a variety of applications, and unsaturated cyclic compounds having a cyclobutane ring are of particular interest. The primary objects of this invention are, therefore to provide new methods of making unsaturated cyclic compounds having a cyclobutane ring in their structure and to provide new classes of such compounds.

The products of this invention are 1-cyanobicyclo[4.2.0]octa-2,4-dienes of the formula

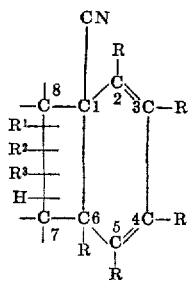

wherein R is hydrogen, a lower alkyl group, i. e., an alkyl group of up to six carbon atoms, or a nitrile group, with not more than one R being nitrile, $R^1$ and $R^3$ are hydrogen atoms or lower alkyl groups, as defined, and $R^2$ is hydrogen or an —$R^4$, —$OR^4$, —$COR^4$, or —$OCOR^4$ group, $R^4$ being lower alkyl as defined. The total number of carbons in all substituent groups should be not over 48.

The products of this invention are prepared by contacting a benzonitrile of the formula

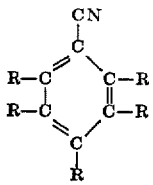

with an ethylenically unsaturated compound of the formula

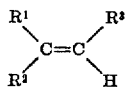

wherein R, $R^1$, $R^2$, and $R^3$ have the significance given above, in the presence of ultraviolet light.

The process of this invention is conveniently carried out by placing a mixture of a benzonitrile and an ethylenic compound of the formulas above in a vessel of a type which allows the reaction mixture to be irradiated by ultraviolet light. The light can be provided by either an internal or external ultraviolet source. If an external source of light is used, the vessel is constructed of a material which is transparent to ultraviolet light, e. g., quartz or a borosilicate glass containing about 96% combined silica. If an internal source of light is used, the vessel can be constructed of ordinary glass or of metal. A convenient source of ultraviolet light is a mercury resonance arc produced in a quartz coil which can be immersed in the reaction mixture.

The reaction of this invention is not known to occur in the absence of ultraviolet light. Thus if a reaction mixture is made up in a "Pyrex" vessel, substantially opaque to ultraviolet radiation, and an external source of ultraviolet light is employed, no reaction takes place.

In some cases when an easily polymerized ethylenic compound is being used as one of the reactants, a layer of polymer forms on the ultraviolet light-irradiating coil. In such cases it is desirable to interrupt the irradiation periodically to remove the polymer adhering to the coil.

A convenient wave-length range for the ultraviolet light is between about 1850 A. and 3000 A. but other ultraviolet frequencies can be employed as well.

The relative proportions of reactants employed are not critical. Proportions ranging from 1 to 3 equivalents of the ethylenic compound to one equivalent of benzonitrile give satisfactory results, but other proportions can be used if desired.

The reaction temperature and pressure are likewise not critical. Addition of the ethylenic compound to the benzonitrile takes place at ordinary temperature, i. e., 20–30° C. However, higher or lower temperatures can be used if desired, e. g., temperatures ranging from the melting point of the higher melting reactant to the boiling point of the lower boiling reactant. Ambient atmospheric pressure, being convenient, will often be employed but superatmospheric and subatmospheric pressures are also operable.

Irradiation time is not too critical but, since the yield is roughly proportional thereto, will generally be rather long. Several days of irradiation are generally employed. The intensity of the ultraviolet light also affects yield to some extent but generators such as the mercury resonance arc mentioned above give acceptable results in reasonable lengths of time.

The starting materials used in the process of this invention can be the grades of benzonitriles and ethylenic compounds of good quality available commercially. In some cases it is desirable to redistill the reactants just prior to their use.

In the preferred manipulations of the process, the reaction vessel is charged with the reactants and the free space thereabove swept out with an inert gas such as nitrogen. The vessel is closed and the reactants irradiated for several days with ultraviolet light. When the irradiation is completed, the 1-cyanobicyclo[4.2.0]octa-2,4-diene is generally isolated in a distillation procedure.

When the ethylenic reactant is a low-boiling material, any excess or unreacted portion of this reactant may be removed at the end of the irradiation period by evaporation. The residue can then be subjected to fractional distillation to remove unreacted benzonitrile and to isolate the 1-cyanobicyclo[4.2.0]octa-2,4-diene. The cyanobicyclo-octadiene can optionally be subjected to purification treatments, e. g., by treatment with aqueous inorganic acids to remove basic impurities, and then distilled.

There follow some nonlimiting examples which illustrate both the process and the product of the invention in greater detail. In these examples, unless otherwise specified, the pressure is substantially ambient atmospheric and the temperature essentially that of the room or slightly lower, i. e., as determined by a water jacket. Reduced pressures are given in terms of mm. of mercury.

Example 1

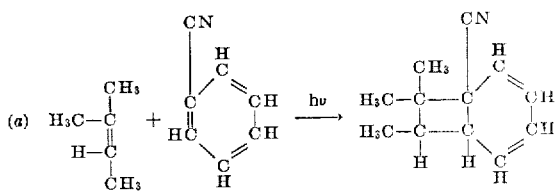

An ultraviolet irradiator of the type described by Kharasch and Friedlander in J. Org. Chem. 14, 245 (1949) fitted with a mercury resonance arc and a water jacket is charged with 145 cc. of benzonitrile and 460 cc. of 99% 2-methyl-2-butene. The system is flushed with nitrogen and then the inlet and outlet to the reaction vessel are closed. The mercury resonance arc is operated at about 9000 volts and 30 milliamperes for 26 days. Unreacted olefin is evaporated from the mixture, and the remainder is distilled through a spinning band column at reduced pressure. After 110 cc. of benzonitrile is recovered, there is obtained 9.5 g. of impure 7,8,8-trimethylbicyclo[4.2.0]octa - 2,4 - diene - 1 - carbonitrile, boiling at 56–68° C./0.1 mm.

The crude product is dissolved in diethyl ether and extracted with 5% hydrochloric acid to remove basic impurities. Evaporation of the ether solution yields 7.6 g. of yellow liquid. On distillation of this liquid through an efficient fractionating column, there is obtained 6 g. of colorless liquid boiling at 42–44° C./0.02 mm., and having a refractive index, $n_D^{25}$, of 1.4970.

Analysis.—Calcd. for $C_{12}H_{15}N$: C, 83.19%; H, 8.73%; N, 8.09%. Found: C, 83.08%; H, 8.65%; N, 8.21%.

The ultraviolet spectrum has an absorption peak at 274 millimicrons ($\Sigma=3370$); and a minimum at 227 millimicrons ($\Sigma=865$). The infrared absorption spectrum exhibits a sharp band at 4.5 microns.

Various derivatives of the product of (a) may be prepared as follows:

(b) A solution of 0.79 g. of 7,8,8-trimethylbicyclo-[4.2.0]octa-2,4-diene-1-carbonitrile in acetic anhydride is hydrogenated at room temperature and atmospheric pressure in the presence of 100 mg. of platinum oxide. The uptake of hydrogen beyond 1 mole-equivalent is slow and the reaction is continued for 72 hours with two subsequent additions (100 mg. each) of fresh catalyst. The solution is filtered and the acetic anhydride is decomposed by stirring the solution for one hour with an equal volume of water. The acid is neutralized with solid potassium hydroxide and the aqueous solution is extracted with ether. The ether solution is washed with 5% hydrochloric acid and water. Evaporation of the ether gives 0.83 g. of a white, sticky solid. Crystallization from petroleum ether-benzene gives colorless rods, M. P. 139–140° C., of N-acetyl-(7,8,8)-trimethylbicyclo[4.2.0]-octane-1-methylamine:

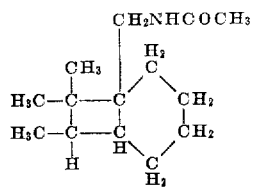

Analysis.—Calcd. for $C_{14}H_{25}ON$: C, 75.28%; H, 11.28%; N, 6.27%. Found: C, 74.83%; H, 11.15%; N, 5.71%.

The infrared spectrum exhibits bands characteristic for mono-substituted amides (2.99, 6.05 and 6.61 microns).

(c) A benzene solution of 1.5 g. (0.087 mole) of 7,8,8 - trimethylbicyclo[4.2.0]octa - 2,4 - diene - 1 - carbonitrile and 2.5 g. (0.0175 mole) of dimethyl acetylene-dicarboxylate containing 10 mg. of hydroquinone is heated at 60° C. under nitrogen for 48 hours. Most of the benzene evaporates, leaving an orange-yellow oil which is dissolved in 2 cc. of benzene. Addition of 5 cc. of petroleum ether causes 1 g. of white material, M. P. 117° C., to precipitate out. Crystallization from benzene-petroleum ether gives colorless, cubical crystals, melting at 121–122° C., of the Diels-Alder adduct:

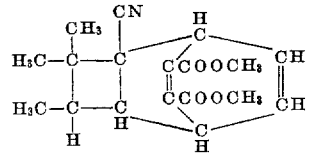

Analysis.—Calcd. for $C_{18}H_{21}O_4N$: C, 68.55%; H, 6.71%. Found: C, 68.77%; H, 6.69%.

(d) A 0.7-g. sample of the Diels-Alder adduct described in the preceding paragraph is placed in a micro-Claisen flask equipped with a nitrogen capillary. Two receivers are used in series, the first ice-cooled, the second cooled in a mixture of acetone and solid carbon dioxide. A vacuum of 1 mm. is applied to the system. The Claisen flask is immersed in an oil bath heated to 200° C. Decomposition occurs immediately, producing two fractions: (1) a colorless oil which distills into the ice-cooled receiver, amounting to 0.267 g. and having a refractive index, $n_D^{25}$, of 1.5095; and (2) a liquid which condenses in the acetone-solid carbon dioxide-cooled receiver, amounting to 0.17 g. and having a refractive index, $n_D^{25}$, of 1.4464.

A solution of 0.115 g. of fraction (1) in ethanol is added to a solution of potassium hydroxide in aqueous ethanol and refluxed four hours. The solution is acidified and evaporated to dryness in vacuo. Sublimation at 200° C. and atmospheric pressure gives 60 mg. (67%) of phthalic anhydride, M. P. 130–131° C. A mixed melting point with an authentic sample of phthalic anhydride is 130–131° C. Fraction (1) exhibits an infrared absorption spectrum nearly identical with that of pure dimethyl pure dimethyl phthalate.

Fraction (2) exhibits a strong peak at 4.55 microns in the infrared spectrum, and is 3,4,4-trimethyl-1-cyclobutenecarbonitrile,

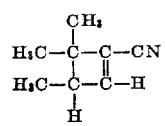

An acetic anhydride solution of fraction (2) is hydrogenated at room temperature and atmospheric pressure in the presence of 100 mg. of Platinum oxide. After 48 hours the hydrogenation is complete; the solution is then filtered, excess acetic anhydride decomposed with water, and the solution neutralized with solid potassium hydroxide. Ether extraction gives a yellow oil which is dissolved in petroleum ether and chromatographed on neutral alumina (activity I). The material eluted with 1:1 petroleum ether/benzene is distilled at 0.06 mm. with a bath temperature of 100° C. giving 60 mg. of colorless oil. This product has the formula:

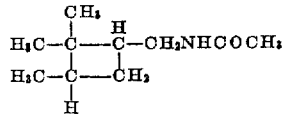

Analysis.—Calcd. for $C_{10}H_{19}NO$: C, 70.96%; H, 11.32%; N, 8.23%. Found: C, 70.36%, 70.59; H, 11.41%, 11.47; N, 7.65%.

The infrared spectrum of this product exhibits bands characteristic for a mono-substituted amide (3.0, 6.06, and 6.6 microns).

Example 2

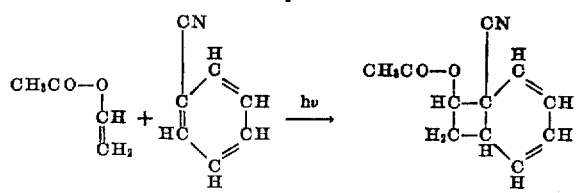

An ultraviolet light irradiator of the type used in example 1 is charged with 78 g. of vinyl acetate and 34 g. of benzonitrile. The mixture is irradiated with a mercury resonance arc operated at 9000 volts and 30 milliamperes for five days at room temperature. Unreacted vinyl acetate is evaporated from the reaction mixture and the residue is distilled at reduced pressure. After recovery of unreacted benzonitrile, there is obtained a slightly yellow liquid, B. P. 105–110/0.04 mm. and $n_D^{25}$ 1.510. This compound is 8-acetoxybicyclo[4.2.0] octa-2,4-diene-1-carbonitrile.

*Analysis.*—Calcd. for $C_{11}H_{11}O_2N$: C, 69.82%; H, 5.86%; N, 7.40%. Found: C, 69.99%; H, 6.03%; N, 7.53%.

The infrared absorption spectrum of this compound exhibits a split band in the nitrile region (4.46 and 4.49 microns) and bands characteristic for an acetate at 5.73 and 8.11 microns.

Example 3

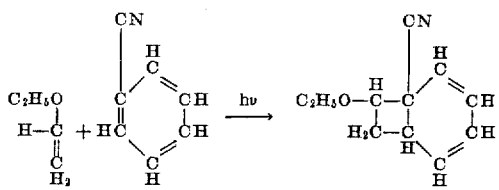

A mixture of 51.5 g. of benzonitrile and 36.1 g. of ethyl vinyl ether which has been freshly distilled from sodium is irradiated in apparatus of the type used in the preceding examples with a mercury resonance arc operated at 9000 volts and 30 milliamperes for 44 hours. At the end of this time the excess vinyl ether is evaporated from the reaction mixture and the residue is distilled through a spinning band column. After separation of unreacted benzonitrile, there is obtained 0.5 g. of a colorless liquid boiling at 55–57° C./0.05 mm. and having a refractive index, $n_D^{23}$, of 1.5158. This is 8-ethoxybicyclo[4.2.0]octa-2,4-diene-1-carbonitrile.

*Analysis.*—Calcd. for $C_{11}H_{13}ON$: C, 75.40% H, 7.48%; N, 7.99%. Found: C, 75.61%; H, 7.46%; N, 9.44%.

The ultraviolet absorption spectrum has a maximum at 277 millimicrons ($\Sigma=3662$) and a minimum at 234 millimicrons ($\Sigma=2360$).

The examples have illustrated the process and products of this invention by specific reference to certain 1-cyanobicyclooctadienes. However, the products of this invention include other 1-cyanobicyclooctadienes of the formula

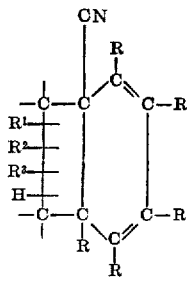

wherein R, $R^1$, $R^2$, and $R^3$ have the significance given hereinbefore. Thus, when the benzonitrile and the ethylenic compounds of the examples are replaced by the reactants listed in the following table, the specific cyanobicyclooctadiene products given in the table are obtained.

Table

| Reactants | | Products |
|---|---|---|
| Nitrile | Ethylenic Compound | |
| p-Tolunitrile | 1-octene | 8-n-hexyl-4-methylbicyclo [4.2.0]-octa-2,4-diene-1-carbonitrile. |
| 2,3-xylonitrile | propene | 2,3,8-trimethylbicyclo [4.2.0]-octa-2,4-diene-1-carbonitrile. |
| 3,4,5-trimethylbenzonitrile | ethylene | 3,4,5-trimethylbicyclo [4.2.0]-octa-2,4-diene-1-carbonitrile. |
| Benzonitrile | 2,4,4-trimethyl-1-pentene | 7-methyl-8-(2,2-dimethylpropyl)-bicyclo [4.2.0]-octa-2,4-diene-1-carbonitrile. |
| Do | methyl vinyl ketone | 8-acetylbicyclo [4.2.0]-octa-2,4-diene-1-carbonitrile. |
| Do | methyl acrylate | methyl 1-cyanobicyclo [4.2.0]-octa-2,4-diene-8-carboxylate. |
| Phthalonitrile | 2-methyl-2-butene | 7,8,8-trimethylbicyclo [4.2.0]-octa-2,4-diene-1,2-dicarbonitrile. |
| Terephthalonitrile | 1-butene | 8-ethylbicyclo [4.2.0]-octa 2,4-diene-1,4-dicarbonitrile. |

The products of this invention are useful as intermediates in the synthesis of substituted cyclooctatetraenes. For example, when 8-acetoxybicyclo[4.2.0]-octa-2,4-diene-1-carbonitrile is heated it is converted to bicyclo [4.2.0]-octa-2,4,7-triene-1-carbonitrile and cyclooctatetraene-1-carbonitrile. The resulting substituted cyclooctatetraenes are in turn useful as analogues of pharmaceuticals in which the benzene rings are replaced by cyclooctatetraene substituents. The products of this invention are also useful as dienes for the synthesis of polyfunctional Diels-Alder adducts which are useful as co-monomers and as crosslinking agents as well as for the synthesis of insecticides of the chlordane type. For example, the products of this invention can be chlorinated to form insecticides which can be used in emulsifiable oils or as wettable powders to control many insects including flies, mosquitoes, etc. Furthermore the products of this invention are useful in the production of polymers containing nitrile functions.

Since obvious modifications in the invention will occur to those skilled in the art, we propose to be bound solely by the appended claims.

The embodiments of the invention in which an exclusive property or privilege is claimed are defined as follows:

1. A 1-cyanobicyclo[4.2.0]octa-2-,4-diene of the formula

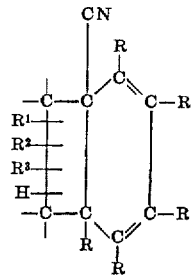

wherein: (1) R is a member of the class consisting of hydrogen, lower alkyl groups, and the nitrile group, not more than one R being nitrile; (2) $R^1$ and $R^3$ are members of the class consisting of hydrogen and lower alkyl groups; (3) $R_2$ is a member of the class consisting of —$R^4$, —$OR^4$, —$COR^4$ and —$OCOR^4$, —$R^4$ being a lower alkyl group; and (4) the total number of carbon atoms in all substituent groups is not over 48.

2. 7,8,8-trimethylbicyclo[4.2.0]octa-2,4-diene-1-carbonitrile.

3. 8-acetoxybicyclo[4.2.0]octa-2,4-diene-1-carbonitrile.

4. 8-ethoxybicyclo[4.2.0]octa-2,4-diene-1-carbonitrile.

5. The method of preparing a compound of claim 1 which comprises reacting a benzonitrile of the formula

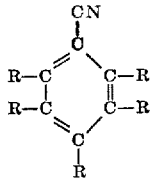

with an ethylenically unsaturated compound of the formula

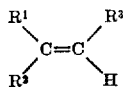

wherein R, $R^1$, $R^2$ and $R^3$ are as defined in claim 1, in the presence of ultraviolet light.

6. The method of preparing the compound of claim 2 which comprises reacting benzonitrile with 2-methyl-2-butene in the presence of ultraviolet light.

7. The method of preparing the compound of claim 3 which comprises reacting benzonitrile with vinyl acetate in the presence of ultraviolet light.

8. The method of preparing the compound of claim 4 which comprises reacting benzonitrile with ethyl vinyl ether in the presence of ultraviolet light.

No references cited.

UNITED STATES PATENT OFFICE
Certificate of Correction

Patent No. 2,805,242            September 3, 1957

Donald Emory Ayer et al.

It is hereby certified that error appears in the printed specification of the above numbered patent requiring correction and that the said Letters Patent should read as corrected below.

Column 4, line 31, for "0.17 g." read —0.174 g.—; column 6, line 23, in the table, third column thereof, for "[4.2.0]-octa 2,4-" read — [4.2.0]-octa-2,4- —; line 51, claim 1, for "[4.2.0]octa-2-,4-diene" read —[4.2.0]octa-2,4-diene—; line 70, for "$R_2$ is a member" read —$R^2$ is a member—; line 71, for "—OCOR⁴, —R⁴ being" read — —OCOR⁴, R⁴ being —.

Signed and sealed this 5th day of November 1957.

[SEAL]

Attest:
KARL H. AXLINE,
*Attesting Officer.*

ROBERT C. WATSON,
*Commissioner of Patents.*